Figure 1:
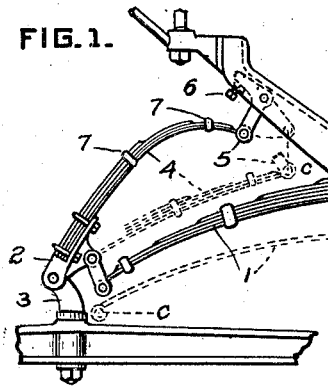

Feb. 23, 1926.

F. L. O. WADSWORTH

SHOCK ABSORBING SUSPENSION SYSTEM

Filed April 11, 1922 — 4 Sheets-Sheet 1

INVENTOR
F. L. O. Wadsworth

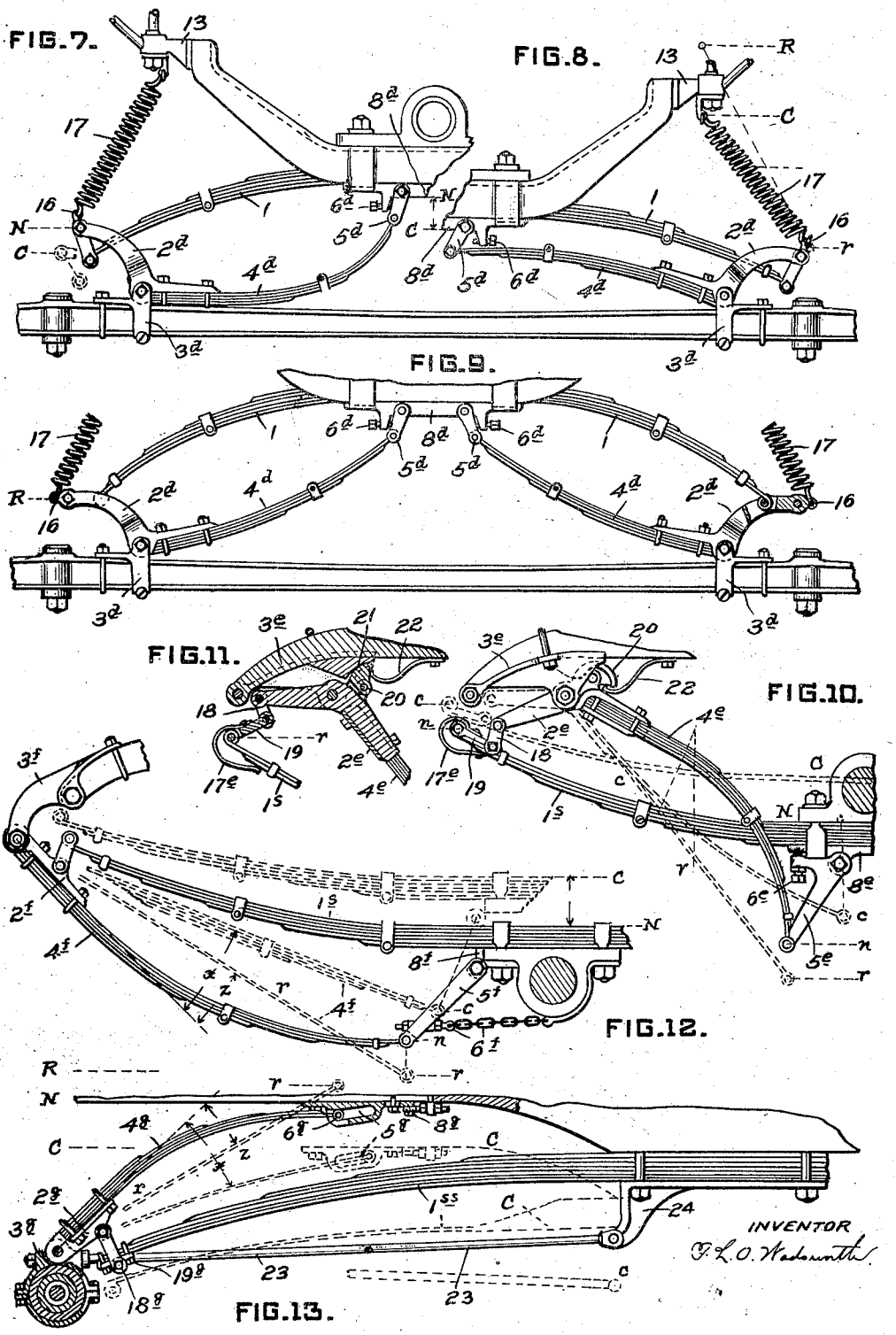

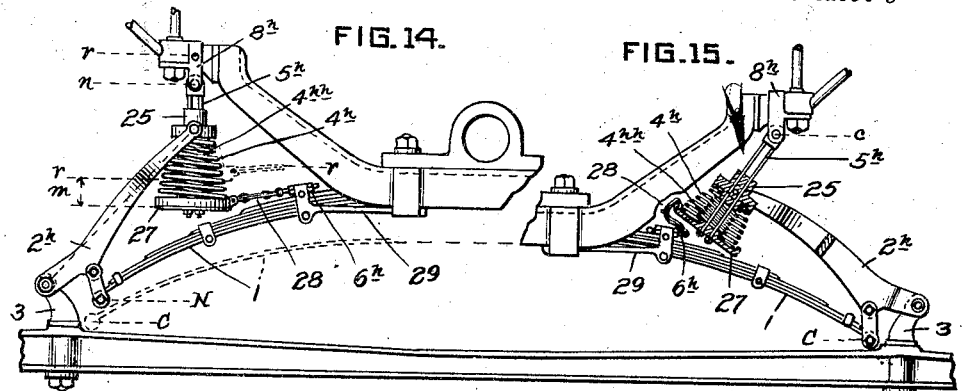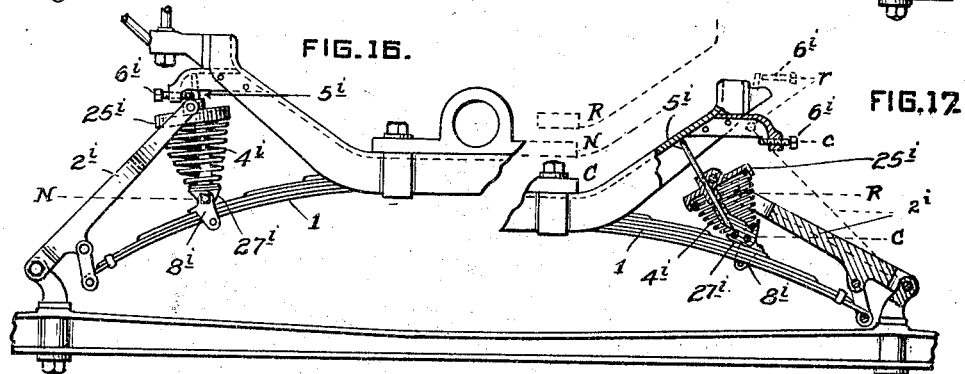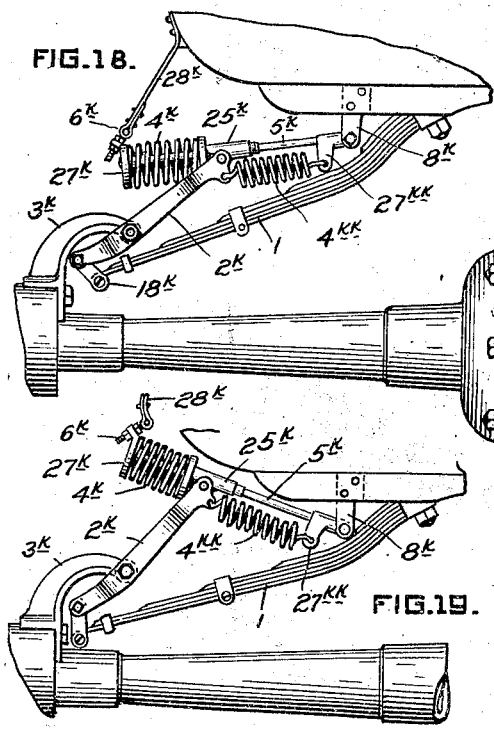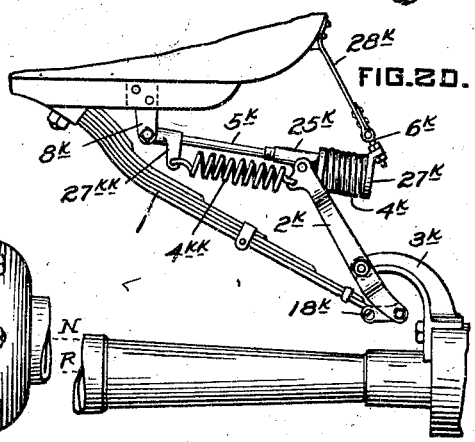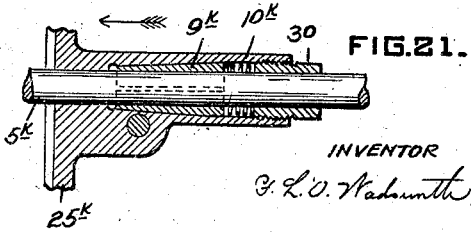

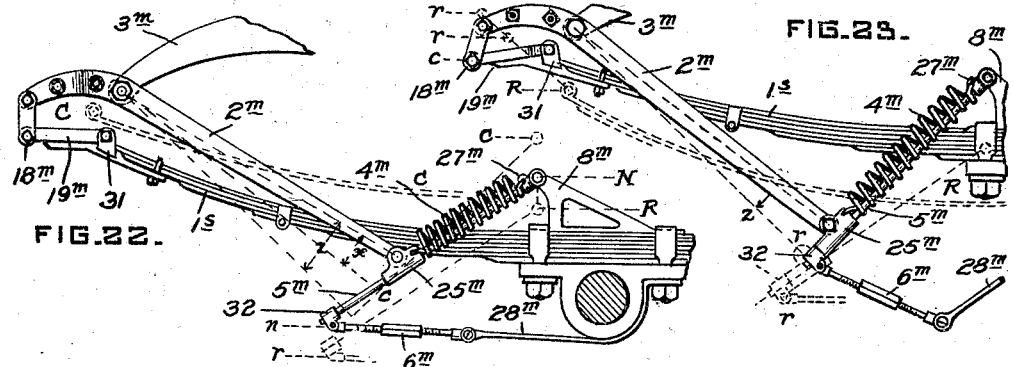
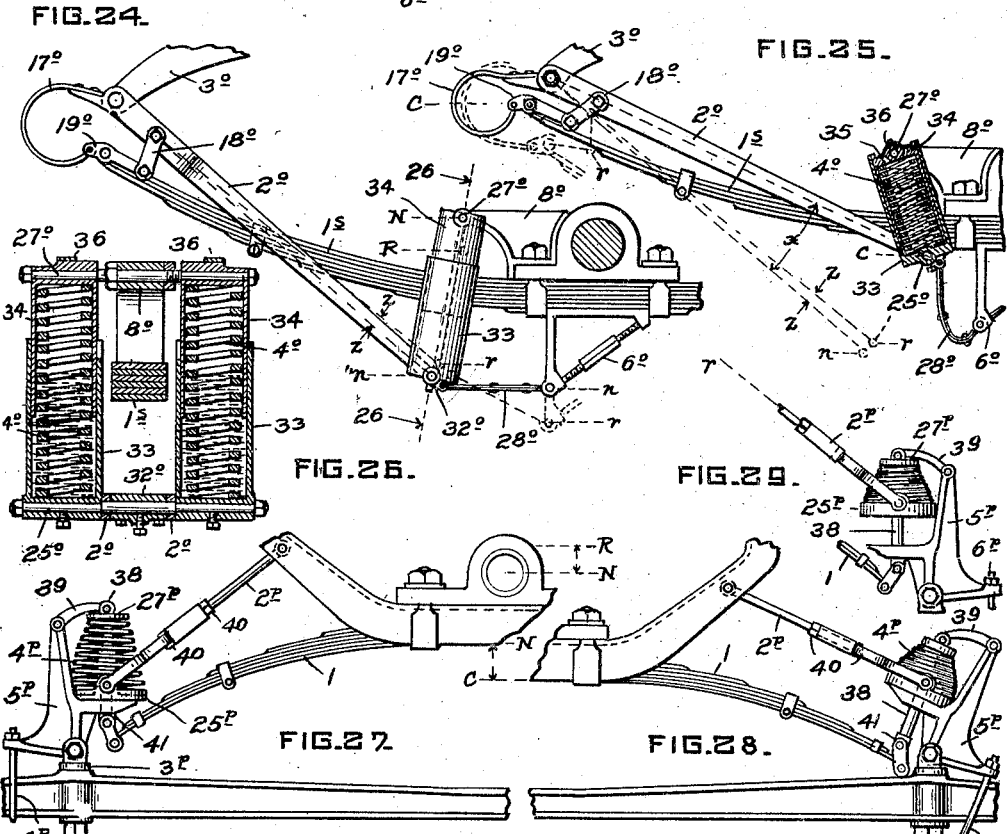
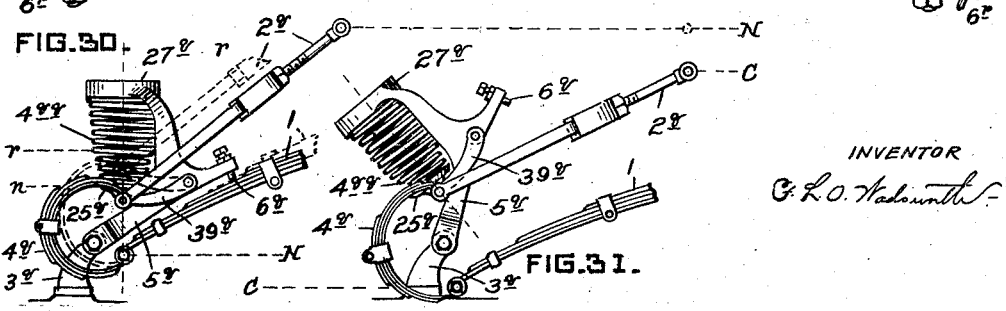

Patented Feb. 23, 1926.

1,574,140

UNITED STATES PATENT OFFICE.

FRANK L. O. WADSWORTH, OF PITTSBURGH, PENNSYLVANIA.

SHOCK-ABSORBING SUSPENSION SYSTEM.

Application filed April 11, 1922. Serial No. 551,674.

*To all whom it may concern:*

Be it known that I, FRANK L. O. WADSWORTH, a citizen of the United States, residing at Pittsburgh, Pennsylvania, have invented a new and useful Improvement in Shock-Absorbing Suspension Systems, of which the following is a full, clear, and exact description, such as will enable others skilled in the art to which it appertains to make and use the same.

My invention relates to shock absorbing suspension systems for vehicles of various kinds and has for its object the provision of a simple and reliable combination of primary and secondary springs which will efficiently cooperate, and complement each other, in cushioning and absorbing both the minor and the major vibrations, oscillations, and shocks, to which the vehicle wheels and running gear are subjected in passing over irregular road surfaces; and which will thus effectively prevent or restrain any unpleasant or dangerous movements of the elastically supported body portions of the vehicles.

Another object of my present improvements is the utilization of a single secondary or supplemental spring for elastically restraining, both the relative approach of the running gear and tonneau members of the vehicle chassis, and also the rebound or recoil of those members above or beyond the normal or static load position. A further object of the invention is the arrangement of one or more pairs of such supplemental springs in such relation to the coacting parts of the system as to effectively resist and check any lateral displacement of the body members on the running gear supports.

Still another specific object of these improvements is the frictional damping of the recoil movements of the secondary suspension springs for the purpose of diminishing the range and the "rapidity" of the oscillation or vibration of these resilient elements and thus reducing or eliminating the effects of excessive rebound movements.

A further specific feature of my present invention is the use of a secondary or supplemental leaf spring member in such manner as to utilize the transverse elasticity of the spring in resisting compressive movements of the system and to utilize the longitudinal resilience of the leaf elements in restraining rebound and side sway of the body away from its centralized normal position of static equilibrium.

Figure 2:
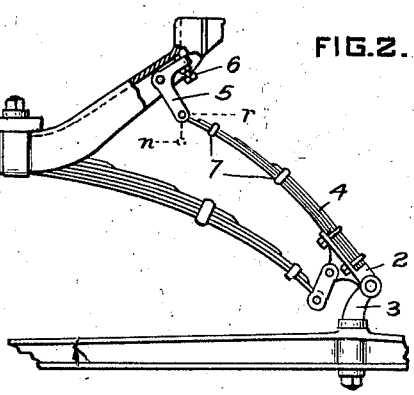
Figure 3:
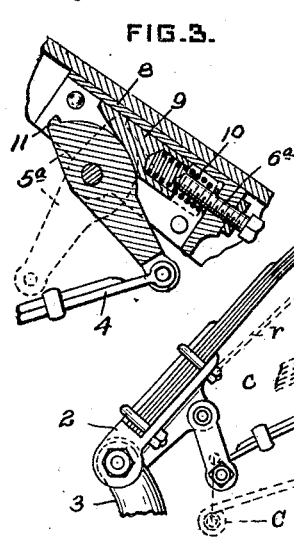
Figure 4:
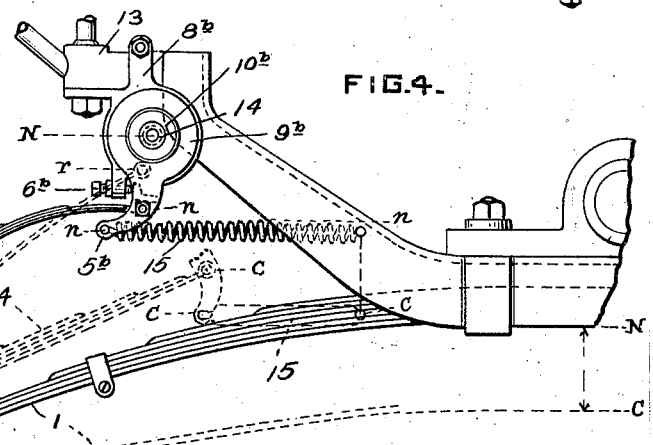
Figures 5, 6:
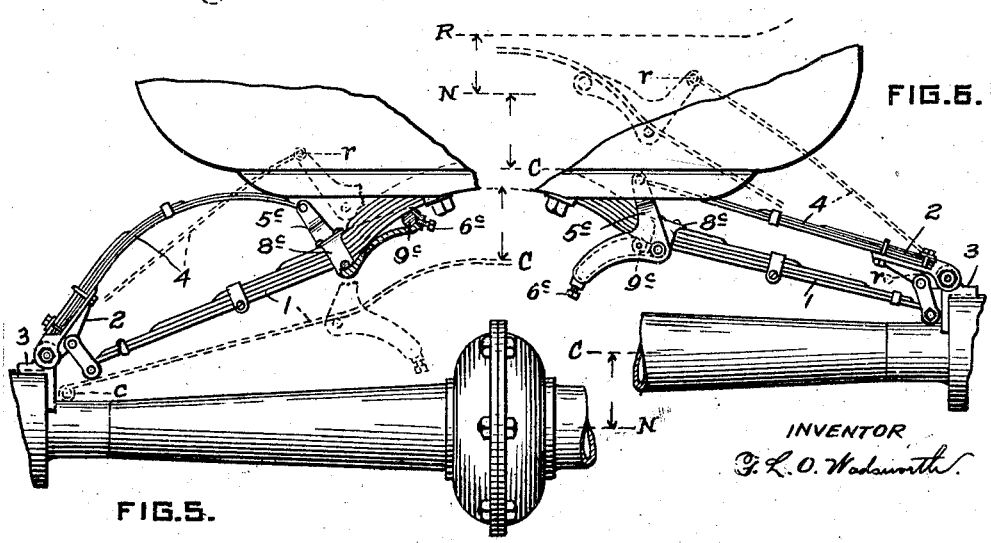

Additional objects and advantages of various particular applications and exemplifications of my improved suspension systems will be made apparent, to those skilled in this art, by the following description of various exemplary embodiments of the present invention, that are illustrated in the accompanying drawings, in which:

Fig. 1 is a front elevation of one side of an ordinary cross leaf spring suspension that is provided with one of my improved forms of secondary leaf spring elements; Fig. 2 is a corresponding view of the other side of this system with the parts in the position of extreme rebound; Fig. 3 is an enlarged sectional view of a portion of the construction shown in Figs. 1 and 2 and shows a modified form of the link connection between the secondary leaf spring element and the body member of the vehicle; Fig. 4 is an enlarged front elevation of the same form of suspension that is illustrated in Figs. 1 and 2 and depicts still another modification of the said link connection; Fig. 5 is a rear elevation of a cross leaf spring suspension system for the rear axle mounting of a Ford car; Fig. 6 in a corresponding view of this same system with the parts thereof in the position of extreme compression; and Figs. 7, 8 and 9 illustrate another exemplification of my invention as applied to the front cross leaf spring of this type of vehicle.

Fig. 10 is an elevation of the rear portion of a side leaf spring support which is provided with my improved secondary spring suspension; Fig. 11 is a sectional view of a portion of this secondary suspension mechanism with the parts thereof in the rebound position; Fig. 12 is an elevation of another side leaf spring suspension embodying my improvements; and Fig. 13 is a similar view of a cantilever spring system that comprises still another form of my invention.

Figs. 14—15 and 16—17 depict two other exemplifications of the present improvements as applied to the cross leaf spring support for the front axle of motor vehicles and Figs. 18, 19 and 20 illustrate still another embodiment of these improvements as they may be utilized in conjunction with a similar cross-leaf spring support for the rear axle of the vehicle; Fig. 21 is an enlarged sectional view of a part of the secondary suspension construction which is shown in Figs. 18, 19 and 20, and which may also be used in conjunction with other exemplifications of my improvements; Figs. 22 and 23 illustrate a secondary suspension construction similar to that depicted in Figs. 18 to 21, as applied to either the front or rear side leaf spring members of a chassis frame; Fig. 24 is an elevation of another side leaf spring system in which a somewhat different form of secondary suspension construction is employed; Fig. 25 is a similar view—in partial section—of this last construction with the members in the position of extreme compression; Fig. 26 is a transverse section on the plane 26—26 of Fig. 24; Figs. 27—28 and 29 illustrate a further modification of my improvements as applied to a spring shackle support for cross leaf (or side leaf) springs; and Figs. 30 and 31 depict an additional exemplification of this last application of my invention.

In the construction shown in Figs. 1 and 2 the shackle links at the ends of the main cross leaf spring 1 are coupled to the intermediate portions of lever members 2, 2; and the latter are in turn pivotally supported at their outer ends, on the reversed axle perches 3, 3. These levers carry the thick ends of flexible supplemental leaf springs 4—4 which are conjoined, at their inner eye ends, to the body members of the vehicle, by means of the bell crank link connections 5, 5. The link elements 5, 5, are provided with adjustable stops 6—6 which are adapted to engage with the body support, on which the said elements are pivoted, and thereby limit the outward swinging movement of the link ends to which the supplemental springs 4—4 are connected. The stops 6, 6 are so set as to make contact engagement with the body when the secondary springs are subjected to such initial tension or flexure, as will suffice to maintain the parts in the position of static equilibrium (N)—as shown in Fig. 1.

The operation of this system is as follows: When the running gear or tonneau members are subjected to a kinetic compression stress—which tends to move them toward each other—the shackle links at the ends of the main spring 1 exert an increased pull on the levers 2—2, and the secondary springs 4—4 attached thereto, and produce an increased flexure of the latter elements that straightens them out and carries them downward toward the dotted line position C—C of Fig. 1. This movement rocks the link connections 5—5 inwardly and disengage the stops 6—6 from contact with the body support. When the increased kinetic load stress is relieved the flexed supplemental springs 5—5 will recoil toward the normal load position of Fig. 1, but this return movement is damped and retarded by the frictional engagement of the superimposed leaves of the secondary springs; and this frictional damping action may be accentuated, to any desired degree, by the provision of binding clips 7—7 at several points in the length of the said springs.

If the compression of the parts is excessive the subsequent recoil of the stressed members—or the abnormal separation of the body and axle parts from other causes—may result in an expansion of the system which will carry the members thereof from the full line position shown in Fig. 1 toward that shown in Fig. 2. In this separation of the chassis parts the links 5—5 will be held against further outward movement by the engagement of the stops 6, 6, with the body member of the vehicle; and the resultant connected motion of the interlocked link and body elements away from the axle perch supports 3—3, will exert a longitudinal or endwise pull on the bowed leaf springs 4—4, that will flatten or straighten them out to the form shown in full lines in Fig. 2. This action will elastically resist any rebound or separation of the connected body and axle members, and will quickly check any such expansion of the suspension system without imposing any substantial reverse strain or flexure, on the main spring member 1.

It will be observed that in both the normal and the expanded positions of the chassis members the body of the vehicle is always subjected to two oppositely directed and symmetrically applied forces—viz, the longitudinal tensions of the two symmetrically disposed secondary leaf springs 4—4, that are transmitted to the body through the links 5—5 and the stops 6, 6—which tend to hold it centered with respect to the axle supports 3, 3, and to strongly resist any side sway or rolling of the tonneau on the running gear frame. This secondary spring restraint against relative lateral movement of the chassis members rapidly increases as the expansion movement continues; and at the extreme position of rebound shown in Fig. 2—the position in which a side sway would be most unpleasant and dangerous— the two strongly flexed and oppositely inclined leaf springs 4, 4, will act almost as effectively as rigid braces in preserving an exact centering of the body between the axle perches 3, 3. When the parts are in a position of compression—and the tonneau and the running gear supports are relatively close together—side sway is less objectionable; and in this position (as indicated in dotted lines in Fig. 1) the body is held in its centered relationship to the axle perches by the symmetrical pull of the oppositely inclined link connections 5, 5, and by the increase in the longitudinal stress on one of the supplemental springs, as compared with the other, whenever the body swings away from this central position.

In the construction shown in Figs. 1 and 2 the damping of the recoil movements of the secondary springs is effected entirely by the frictional resistance to the relative longitudinal slip of the pressure engaged leaves of these resilient elements; and in the case of such highly flexible and strongly bowed springs as I prefer to employ in the said construction this relative slip is sufficiently large to produce a very marked and substantial damping of the spring movements. But in order to supplement this damping action I may in some cases, use the form of link connection shown in section in Fig. 3. This comprises a cam shaped link $5^a$, that is pivoted between the sides of a hollow bracket 8, (which is riveted, or otherwise suitably secured to the body frame) and a wedge shaped block 9 which is slidably mounted in the bracket 8 and is held against the curved cam face of the link $5^a$ by the spring 10. The upper toe end of the cam link is provided with a shoulder 11 which is adapted to engage with the adjacent end of the wedge block 9 when the parts are in the normal (dotted line) position of Fig. 3; and in this position the link and block elements are locked against further relative movement in the bracket and body supports by the engagement of an adjustable screw stop $6^a$ with the lower recessed end of the block 9. When the body and axle members are forced toward each other the increased flexure of the secondary spring 4—which is attached to the lower end of the link element $5^a$—swings the said link inwardly, toward the full line position of Fig 3, and permits the spring 10 to push the block 9 upwardly against the head of the cam face. When the recoil or return movement begins the reverse motion of the engaged cam and block elements is retarded or damped by the frictional resistance between the relatively sliding surfaces of the said elements and the bracket support 8. This damping action on the swinging movement of the link supplements the interleaf frictional retardation of the recoiling spring 4 and thereby assists in preventing a too sudden reaction and "overthrow" of the compressed resilient suspension elements.

The construction shown in Fig. 4 is substantially identical with that shown in Figs. 1 and 2 with the exception of the connection between the supplemental leaf spring 4 and the body frame. In this exemplary illustration of my invention the supporting link $5^b$ is pivotally mounted on a head $8^b$ which is clamped to the mud guard bracket 13, of the vehicle, and the engaging surfaces of these members ($5^b$—$8^b$) are provided with friction disc elements $9^b$ that are held in elastic pressure contact with each other by the spring washer and bolt connections $10^b$—14. A tension spring 15 is connected to the lower end of the link arm $5^b$, and subjects the latter to an inward pull that is just sufficient to overcome the static or starting friction between the disc elements $9^b$ when the system is compressed and the parts move from the full line position N—n toward the dotted line position C—c. When the stressed suspension members return from their compressed position, the pull of the spring 15, supplements the action of the frictionally engaged parts $8^b$—$9^b$ in resisting the outward swinging movement of the link support $5^b$ and thereby retards and damps the free recoil of the coacting leaf springs 1 and 4. When the parts have resumed their normal or static load position the link $5^b$ is engaged by the adjustable stop $6^b$ on the head $8^b$; and when the body and axle parts are subjected to a rebound or expansion movement this suspension element is locked against further outward swing, and the vertical separation of the head $8^b$ and the axle perch 3 imposes an endwise stress on the bowed spring 4 and pulls it straight—as indicated by the dotted lines r—r of Fig. 4. The elastic resistance of the secondary suspension elements to this longitudinal pull subjects the chassis members to a progressively increasing restraint that rapidly checks any abnormal separation of the spring supported parts and the symmetrical action of these stressed springs on the opposite sides of the body strongly resists any tendency to side sway, and holds the tonneau members properly centered on their running gear supports.

In the organization illustrated in Figs. 5 and 6, the inner eye ends of the secondary leaf springs 4 are carried by the upper arms of bell crank shackles $5^c$; and these shackles are pivotally mounted on clips $8^c$ that are clamped to the central body portion of the main spring 1. The lower arms of the bell crank elements $5^c$ extend inwardly under the bottom leaf of the main spring, and are provided with longitudinally curved grooves or pockets to receive and retain hardened blocks or rolls, $9^c$, that are adapted to move outwardly and downwardly, under the effect of gravity, when the system is compressed and the parts move from the normal load position (shown in full lines in Fig. 5) toward the position C—c (shown in dotted lines in Fig. 5 and in full lines in Fig. 6). When the compressed suspension members begin their return movement the free recoil of the supplemental spring 4 is retarded both by the frictional drag of its superimposed leaf elements on each other, and also by the sliding, or rolling, engagement of the member 9ᶜ with the adjacent surfaces of the recessed arm and main spring between which it is confined. When the parts have reached normal load position the member 9ᶜ has been forced inwardly in contact with the adjustable stop screw 6ᶜ; and further arcuate movement of the shackle arm 5ᶜ on its bracket support 8ᶜ is thereby arrested. A rebound or abnormal separation of the body and axle members—which carries the parts toward the dotted line positions R—r of Figs. 5 and 6—is then immediately restrained and checked by the longitudinal or endwise stress on the bowed supplemental leaf spring which tends to straighten it out to the form shown in the upper portions of these illustrations. The other functions of the secondary suspension elements—in absorbing minor kinetic shocks and jars and in resisting and arresting side sway at all times in the oscillatory movements of the system—are exercised in substantially the same manner as in the analogous organizations previously described.

Figs. 7, 8 and 9 show another arrangement of elastic suspension members in which the ends of the main cross leaf spring 1 are shackled to the outer extremities of forked lever elements 2ᵈ—2ᵈ, and these levers are pivotally supported, at intermediate points in their length, on saddles, 3ᵈ, 3ᵈ, which are clamped to the front axle of the machine. The inner ends of these levers are rigidly connected to the outer ends of the supplemental leaf springs 4ᵈ—4ᵈ, and the opposite, or inner extremities of the said springs are carried by the swinging link connections 5ᵈ, 5ᵈ, that are pivoted on the body bracket 8ᵈ, and limited in their pivotal movement thereon by the adjustable stops 6ᵈ, 6ᵈ. The swinging shackle links, which couple the levers 2ᵈ, 2ᵈ, to the ends of the main spring, are provided with extensions 16—16, which are engaged by auxiliary tension springs 17—17 that are attached to the mud guard brackets 13 of the body frame. When the system is subjected to compression the parts move from the normal or static load position shown in Fig. 7 to that shown in Fig. 8; and the supplemental leaf spring 4ᵈ is flattened out by the transverse or bending stress to which it is subjected by the upward swing of the inner ends of the lever 2ᵈ. In this movement of compression the length of the auxiliary springs 17—17 is not substantially changed, and these elements merely exert a constant initial tension on the shackle links at the ends of the main spring. But when the body and axle members of the chassis rebound or separate beyond the normal load position N—n of Fig. 7—and move toward the expanded position R—r of Figs. 8 and 9—the link connections 5ᵈ—5ᵈ are at once engaged by the stops 6ᵈ—6ᵈ and the separation of the saddle and bracket members, 3ᵈ and 8ᵈ, exerts a direct longitudinal pull on the attached lever and link elements 2ᵈ—5ᵈ and on the bowed supplemental leaf springs 4ᵈ attached thereto, and thus subjects these suspension elements to an endwise stress that pulls them out as shown in Fig. 9. The straightening out of the springs 4ᵈ rocks the outer ends of the levers 2ᵈ downwardly from their normal load position, and the concurrent upward movement of the body and main spring 1 causes the shackle links which carry the extensions 16 to swing upwardly until they are nearly in line with the said outer ends of the levers 2ᵈ and with the axis of the primary suspension element—as shown in Fig. 9. In this position of the parts the body is vertically locked in its central position on the running gear supports and any further separation of these members is powerfully resisted, by the endwise strain in both the supplemental springs 4ᵈ, 4ᵈ and also in the main spring 1. The rebound movement of the body and the accompanying outward and downward movement of the link ends 16—16 also imposes an increased tension on the auxiliary springs 17, 17—as indicated by the dotted line R—r at the right of Fig. 8—which not only supplements the action of the springs 4ᵈ, 4ᵈ, in resisting and checking rebound and side sway, but which also serves to impose an added pull on the ends of the main spring and to return the shackle link supports therefor to their normal load carrying position when the rebound movement is checked and abated.

Figs. 10 and 11 depict the outer portion of a side leaf spring support—for the rear axle of the vehicle—which is provided with a secondary spring suspension similar to the one last described. In this construction the outer end of the main spring 1ˢ is coupled to the adjacent outer end of the lever member 2ᵉ by means of an elbow shackle connection that comprises; a pair of links 18, pivoted to the extremity of the lever, a forked arm 19, pivoted, at one end, to the links 18 and at the other to the eye of the main spring, and an auxiliary spring 17ᵉ secured to the arm 19 and engaging the opposing face of the main spring. The intermediate portion of the lever 2ᵉ is flexibly supported on the bracket 3ᵉ that is clamped to the body support; and the inner extremity of the said lever is rigidly secured to the base portions of two supplemental leaf springs 4ᵉ which extend inwardly—one on each side of the main spring 1ˢ—and are supported at their eye ends by a link connection 5ᵉ that is pivoted to an axle bracket 8ᵉ and limited in its arcuate movement thereon by an adjustable stop 6ᵉ. In this construction the lever 2ᵉ is also provided with an eccentric friction dog 20 which is pivoted to the swinging member and is held in pressure engagement with the adjacent curved face 21 of the body bracket 3ᵉ by means of the spring 22 (as best shown in the sectional view of Fig. 11). When this system is subjected to compressive stress the arm 19 is held in engagement with the outer end of the main spring by the pressure of the applied load; and the thrust on the links 18 rocks the arm 2ᵉ in a clockwise direction on its bracket support 3ᵉ, applies an increased transverse bending stress to the supplemental springs 4ᵉ, and straightens out the latter to the form shown by the dotted lines c—c of Fig. 10. The clockwise movement of the lever 2ᵉ permits the dog 20 to swing inwardly under the pressure of the spring 22; and when the return movement starts the reverse rotation of the lever—and the accompanying recoil of the stressed suspension elements 4ᵉ—is retarded and damped by the sliding frictional engagement between the curved surfaces of the dog 20 and the bracket face 21. When the parts rebound or separate beyond the normal load position—shown in full lines in Fig. 10—the stop 6ᵉ engages the bracket 8ᵉ and the supplemental springs 4ᵉ are subjected to a longitudinal or endwise stress, that has the joint effect of again rocking the lever 2ᵉ in a clockwise direction and of stretching or flattening out the bowed secondary suspension elements to the form indicated by the dotted lines r—r of Fig. 10. In this rebound movement the end of the main spring 1ˢ is relieved of stress by the opening out of the elbow shackle connection 18—19 (as shown in Fig. 11) against the tension of the spring 17ᵉ; and the free recoil of the stretched springs 4ᵉ is checked, as before, by the frictional engagement of the parts 20—21—22.

Fig. 12 illustrates another side leaf spring suspension system in which the relative arrangement and action of the main and supplemental spring elements is substantially the same as in the construction of Figs. 1 and 2. When this system is subjected to kinetic compressive stress the parts are moved from the full line positions of Fig. 12 toward the upper dotted line positions C—c of that figure—the lever 2ᶠ being rocked in a counterclockwise position through an angle, x, for the extreme movement—and when the body and axle members rebound or separate beyond the position of static equilibrium the link 5ᶠ is locked against the pull of the supplemental spring 4ᶠ (by the adjustable tie connection 6ᶠ) and the latter is stretched or flattened out to the form shown by the dotted lines r—r, while the lever 2ᶠ is correspondingly rocked through the angle z.

Fig. 13 illustrates the application of my improved secondary spring suspension to a main cantilever spring support for either the front or rear axle of a motor vehicle. In this application or exemplification of the present invention the usual coupling between the outer end of the main spring and its axle connection is removed, and replaced by the shackle link and clip elements 18ᵍ—19ᵍ, which serve to flexibly couple the said main spring 1ˢˢ to the intermediate portion of a lever 2ᵍ that is pivoted to the axle block 3ᵍ. This axle block is preferably provided with a pair of tie bars or radius rods 23, which extend inwardly—one on each side of the main spring 1ˢˢ—and are connected to a bracket 24 that is bolted rigidly to the base support for the main suspension member. The supplemental suspension element 4ᵍ is secured at its outer extremity to the lever 2ᵍ, and is provided at its inner eye end with a cross pin guide that slides in the slot 5ᵍ, of the adjustable bracket 8ᵍ, on the body frame. When the system is subjected to kinetic compression stress the parts are moved from the normal full line position of Fig. 13 to the dotted line positions C—c of that illustration; and during this movement the inner end of the secondary leaf spring element slides inwardly along the slot 5ᵍ. But when there is rebound or separation of the body and axle members, beyond or above normal load position, N, the cross guide at the end of the spring 4ᵍ engages with the forked outer end 6ᵍ of the adjustable bracket 8ᵍ; and there is a longitudinal pull exerted on the opposite ends of this spring which pulls it and its lever support 2ᵍ into the dotted line positions r—z—r of the figure.

In all of the organizations thus far described the secondary suspension element is made in the form of an initially bowed leaf spring which is flexed and straightened out under an increased load by a transverse or crosswise bending strain and which is stretched and straightened out under rebound stress by a longitudinal or endwise pull on its opposite ends. But my invention is also generically embodied in an organization in which helical coil springs—of either the open coil compression type or the closed coil expansion type—may be employed as secondary suspension elements. Examples of such embodiments are presented in the illustrations of Figs. 14 to 31 inclusive.

In the combination shown in Figs. 14 and 15, a main cross leaf spring 1 is shackled at its ends to the intermediate portions of lever elements 2ʰ, 2ʰ, which are pivotally mounted on the reversed axle perches 3—3, and which are flexibly coupled at their inner extremities to the upper heads 25, 25 of the nested coil springs 4ʰ—4ʰʰ. These heads 25 are slidably mounted on the swinging link connections 5ʰ—5ʰ, which are pivotally supported on the body brackets 8ʰ; and these link elements also carry the lower heads 27—27 on which the secondary resilient elements 4ʰ—4ʰʰ are supported. These lower heads are each provided with a pair of ears to receive a cross pin to which one end of a flexible strap 28 is secured; and the opposite end of this strap is connected to an adjustable bolt $6^h$ that is held in fixed relation to the main spring and body assembly by the clip 29.

When the above described system is subjected to a kinetic compression shock, or to a temporary increase in load, the parts move from the full line positions N—n of Fig. 14 toward the positions C—c shown in Fig. 15. During this movement the links $5^h$ are swung inwardly, and springs $4^h$—$4^{hh}$ are further compressed against the lower heads 27 by the coaction of the swinging lever and sliding head members $2^h$ and 25. When the parts return to normal load position (Fig. 14) and rebound or separate beyond that position, the further outward movement of the swinging links $5^h$, $5^h$, is arrested by the action of the strap connections 28—$6^h$—29 and these links are held in fixed axial relation to the body of the vehicle. But the upper heads 25—25, and the upper ends of the supplemental springs $4^h$—$4^{hh}$ carried thereby, are also held at a fixed distance from the axle perches 3—3, by the rigid lever elements $2^h$—$2^h$. Any separation of the body support $8^h$ for the links, and of axle support 3 for the lever, will therefore draw the heads 25—27 toward each other and correspondingly compress the secondary suspension elements—as shown by the dotted line movement n—r or m—r of Fig. 14.

The rebound movement (e. g. from m—n toward r—r) will therefore be resisted and checked both by the increased positive compression of the supplemental springs against the link supported heads 27—27, but also by the frictional side drag of the sliding heads 25—25 on the edges of these supporting links. The longitudinal stresses in the symmetrically inclined lever members $2^h$—$2^h$, on the opposite sides of the body, will also hold that member of the chassis centered on the running gear, and will prevent, or quickly extinguish, any side sway or rolling of the vehicle tonneau.

Figs. 16 and 17 illustrate a construction which is very similar in form to the one last considered and which will therefore not require any detailed description. When the system is compressed the swinging link elements $5^i$ rock inwardly on the pivot supports $8^i$—which are, in this case supported on intermediate portions of the main leaf spring 1—and the supplemental coil springs $4^i$ are compressed against the fixed heads $27^i$ (as shown in full lines in Fig. 17). When the parts return to normal load position (Fig. 16) and rebound beyond that position (see dotted lines R—r of Fig. 17) the upper ends of the links $5^i$ are engaged by the adjustable stops $6^i$; and the downward pull of the levers $2^i$ on the sliding heads $25^i$ again subjects the secondary springs to an increased compression which reactively restrains the expansion of the system.

The organization shown in Figs. 18, 19 and 20 is one in which each of the secondary suspension elements comprise two coil springs, one of which is an open coil compression spring $4^k$, and the other of which is a normally closed coil expansion spring $4^{kk}$. These springs are operatively connected, at their adjacent extremities, to common heads, $25^k$, which slide longitudinally on the link rods $5^k$, and are respectively conjoined at their opposite extremities to the heads $27^k$ and $27^{kk}$ which are fixed to the outer and inner ends of the said link rods. The last named elements are pivotally mounted on the body brackets $8^k$, and are limited in their arcuate movement with respect thereto by adjustable bolt and strap connections $6^k$—$28^k$. The heads $25^k$ are flexibly coupled to the inner ends of levers $2^k$, which are pivotally mounted—near their centers—on axle brackets $3^k$, and are shackled, at their outer ends, to the extremities of the main spring 1. When the system is kinetically compressed the various operating parts move from the normal load position (of static equilibrium) shown in Fig. 18, toward, or to, the position shown in Fig. 19—thereby imposing an increased compression strain on the supplemental springs $4^k$, and a correspondingly increased tension strain on the springs $4^{kk}$—and when the body and axle members rebound or separate beyond normal load position (Fig. 18) the link connections $5^k$ are held in fixed relationship to the body, the heads $25^k$ are drawn outwardly on the fixed link rods, by the longitudinal pull of the lever arms $2^k$, and an increased flexure is again imposed on both of the secondary suspension elements $4^k$ and $4^{kk}$ (as shown in Fig. 20.) It will be apparent that in this construction—as in all of the previously described applications of my invention to cross leaf spring systems—the body of the vehicle is, at all times, subjected to the influence of oppositely directed and centrally applied forces, which act through the symmetrically disposed and inwardly inclined lever elements (2) $2^k$; and that by reason of this action any side swing, or rolling of the tonneau, with respect to its running gear supports, is either entirely prevented, or is very effectively restrained and abated; and it will also be apparent that this restraint becomes more and more powerful as the separation, or expansion, movement increases in magnitude; and that, when any excessive rebound occurs—as shown in Fig. 20 (or in corresponding Figs. 2, 9 etc.) —the body member is virtually locked against lateral displacement, on its support system, by the compression or extension of the supplemental spring elements to the limit of their flexural movement.

Attention has already been directed to the fact that in the operation of the species of construction shown in Figs. 14 to 19 inclusive, the resilient restraint of the elastic elements $4^h$, $4^i$ or $4^k$, is supplemented—particularly on rebound or separation of the body and axle members—by the frictional restraint to the sliding movements of the heads $25$—$25^i$ or $25^k$ on the link guides $5^h$, $5^i$ or $5^k$. The frictional restraint on all recoil movements may be increased, if desired, by the use of the devices illustrated in Fig. 21. In the detail construction there shown the hub of the sliding head (e. g., the head $25^k$) is provided with a conical recess, which is adapted to receive a split or divided sleeve $9^k$, that is held in light pressure engagement with the face of the recess by a spring $10^k$ interposed between the larger end of the sleeve and an adjustable plug 30 in the end of the recess. When the head moves in the direction of the arrow—or in a direction to produce an increased flexure of the secondary suspension elements—the pressure of the split sleeve on the surface of the link guide (e. g., $5^k$) is relieved, and the frictional grip of the sliding head on this guide is reduced; but when the return or reverse movement occurs, the action of the spring ($10^k$) forces the divided sleeve ($9^k$) into the conical recess of the head ($25^k$) and against the surface of the link rod ($5^k$), and the "drag" of the moving head on the longitudinally fixed link connection is substantially increased, thereby retarding or damping the free recoil of the stressed secondary springs.

Figs. 22 and 23 illustrate a side leaf spring system which is provided with a frictionally damped secondary spring suspension that is quite similar in form to the one shown in Figs. 18 to 21 inclusive. In the organization now under consideration the lever element $2^m$ comprises a pair of arms which are pivotally mounted, at an intermediate point in their length, on the usual scroll bracket $3^m$ of the body frame; are bolted together at their outer ends and are there shackled to the adjacent extremity of the main spring $1^s$ by means of the links $18^m$, the rock bar $19^m$, and the saddle 31; and are pivotally connected at their inner ends to heads $25^m$ that are slidably mounted on a pair of guides $5^m$ which are symmetrically disposed on opposite sides of the main spring $1^s$. The links $5^m$ are rockably supported, as a unit, on an axle bracket $8^m$, and are limited in their rocking movement thereon by the adjustable and flexible connections $6^m$—$28^m$ that are attached, respectively, to the axle frame and to the cross head 32 that couples together the lower ends of the link elements $5^m$. The secondary suspension springs of this combination consist of a pair of normally closed tension coils $4^m$ which surround the guide rods $5^m$ and are attached at opposite ends to the sliding heads $25^m$ and the fixed head $27^m$ of this guide link connection. When this system is compressed the parts move from the normal load positions N—$n$ of Fig. 22 toward the dotted line positions C—$c$ of that figure—which correspond to the full line positions of Fig. 23— and when it is subjected to expansion or rebound stresses the parts move from the positions N—$n$ toward the dotted line positions R—$r$ of the two illustrations. In the first movement the shackle bar $19^m$ remains in pressure engagement with the saddle support 31, and the thrust of the shackle links $18^m$ rocks the lever $2^m$ through the angle, $x$, (in passing from the positions of Fig. 22 to those of Fig. 23) thereby stretching the supplemental springs to the extent indicated in Fig. 23. In the rebound or expansion movement, from positions N—$n$ to positions R—$r$, the link connections $5^m$ are locked on their bracket supports and the diagonal pull of the lever elements on the heads $25^m$, again stretches the tension springs $4^m$ to substantially the same degree as the first considered movement. This action rocks the lever members $2^m$ through an angle, $z$; and this increased arcuate movement is permitted— without imposing any reverse flexure on the main spring—by the lifting of the shackle bar $19^m$ from its saddle support 31. At the end or limit of the indicated rebound ($r$—$r$) the shackle links $18^m$ and the shackle bar $19^m$ are drawn into substantial alignment with the main spring $1^s$; (see dotted line diagram R—$r$—$r$ at the upper left hand side of Fig. 23); and then exert a direct endwise pull or tension on the main suspension member that tends to supplement the imposed tension on the secondary elements, $4^m$, in resisting abnormal or unusual expansion movements of the spring connected parts.

Figs. 24, 25 and 26 depict another combination of a main side leaf spring with a pneumatically damped secondary spring suspension. In this construction the lever elements $2^o$ comprises two twin arms pivoted at their outer extremities to the body bracket $3^o$, and extending down—one on each side of the main spring $1^s$—to the lower extremities of tubular members 33 that are rigidly secured to the opposite ends of the cross-bolt $25^o$ on which the inner ends of the arms $2^o$ are pivoted (see Fig. 26). The tubular members 33 are engaged by hollow piston elements 34 which are pivotally mounted on a cross bolt $27^o$ that is carried by the axle bracket $8^o$; and a pair of open coil compression springs $4^o$ are interposed between the opposing closed ends of the slidably engaged members 33—34, which together form a swinging link connection between the lever and axle parts of the system. The upper heads of the piston elements 34 are provided with vents 35 which are closed by the outwardly opening flap valves 36; and the interior of the spring receiving chambers may be partially filled with a thick oil or other viscous liquid that serves both to protect the springs, 4°, lubricate the sliding parts 33—34, and reduce the air space in the said chambers, for the purpose later described. The intermediate portion of the cross bolt 25° is provided with a spacing block 32° that is flexibly connected to the axle assembly by means of a strap 28° and an adjustable angle frame 6°. The median portion of the lever 2° is coupled to the adjacent eye end of the main spring 1ˢ, by means of a spring actuated elbow shackle, similar to that shown in Figs. 10 and 11, and comprising the links 18°, the bar 19° and the leaf spring 17° which is engaged at its opposite ends with the bar 19° and the outer extremity of the lever 2°.

The detail operation of the organization last described is very similar to that of the analogous arrangement shown in Fig. 12. When the system is compressed the lever 2° is rocked in a counter-clockwise direction on its main pivot support, and in passing from the normal load position (N—n) of Fig. 24 to the extreme load position (C—c) of Fig. 25 this member describes the arc, x, and compresses the springs 4° to almost 60% of their normally tensioned length (Figs. 24 and 26). As the members 33 and 34 move together, the air in the spring enclosing chambers is expelled through the valve openings 35—36; but when a reverse movement occurs these openings automatically close, and the separation of the heads 25° and 27° creates a partial vacuum in the expanding chambers that tends to pneumatically check the recoil of the compressed springs 4°. When the parts have returned to normal load position (N—n of Fig. 24) the strap and angle frame connections 28°—6° are brought into tensioned engagement with the block 32°; and when any rebound, or separation of the chassis members, occurs the pull of these connections rocks the lever arms through the small angle z—z and draws them into substantial alignment with the strap 28°, while the relative downward movement of the axle bracket 8°, the heads 27° and the piston elements 34 (from N—n to R—r) again compresses the secondary springs 4° to substantially the same degree as they are flexed by the compression movement from N—n to C—c. In this case the recoil or return of the parts from the position of extreme rebound is retarded and damped by the action of the partial vacuum produced in the spring enclosing chambers when the compressed secondary elements begin to expand.

Figs. 27 and 28 show a further exemplification of my generic invention, as adapted to what is generally known as the direct suspension type of a supplemental spring shock absorber (the S. S. S. type); and illustrate a construction that may be applied to the eye end, or ends, of either a cross leaf spring (as shown in these figures) or a side leaf spring such as forms a part of the organizations depicted in Figs. 10—12—13—22 or 24. In the particular form and arrangement here illustrated the supplemental suspension springs 4ᵖ are carried by an L-shaped link frame 5ᵖ which is pivotally mounted on the axle perch, 3ᵖ, and is limited in its angular movement by an adjustable stirrup 6ᵖ that passes around the axle. The upper end of this elastic suspension element is engaged by the head 27ᵖ, that is attached to the movable connection rod, 38, and is guided in its movement by the radius arm 39; and the opposite extremity of the said element is supported by the head 25ᵖ which is provided with an elongated hub that can slide longitudinally on the rod 38. This lower head 25ᵖ is pivotally attached to the forked extremity of a tie arm 2ᵖ, that extends upwardly to the body frame; and the length of this arm is so adjusted (as by the bolt and nut connections 40—40) that when the parts are in normal load position (Fig. 27) the head 25ᵖ is supported on the foot of the L-shaped link frame 5ᵖ. The lower end of the guide rod 38 is slidably engaged in the supporting foot of the link frame, and is provided with an enlarged boss 41 that limits its upward movement therein; and this boss is shackled to the adjacent eye end of the main spring member 1.

The operation of this last described exemplification of my invention is generically identical with that of the previously considered embodiments thereof. When the chassis members are forced toward each other by a temporary increase in load stress, the suspension springs 4ᵖ are compressed by the downward pull of the main spring shackle connections on the rods 38, while the frames 5ᵖ are rocked away from the body by the outward thrust of the tie arms 2ᵖ; thus moving the parts from the normal load position of Fig. 27 toward, and ultimately to, the position of compression shown in Fig. 28. When the system is restored to the condition of static equilibrium the stirrups 6ᵖ engage the axle member and prevent any further inward movement of the link frames 5ᵖ on their axle supports; and the bosses 41 engage with the link frames and prevent any further rise of the guide rods 38. Any rebound or expansion of the spring connected parts imposes a longitudinal pull on the diagonal tie arm connections 2ᵖ, and this, in turn, lifts the lower heads 25ᵖ away from the supporting feet of the frames 5ᵖ and correspondingly compresses the springs 4ᵖ against the upper heads 27ᵖ—as shown in Fig. 29. The oblique pull of the symmetrically inclined tie connections 2ᵖ—2ᵖ on the opposite sides of the body frame restrains any lateral sway of that member on its running gear supports; and this diagonally applied tension on the sliding heads 25ᵖ also increases the frictional "drag" of these parts on the axle supported elements 38—5ᵖ and thus steadies and damps the oscillatory movements of the elastic suspension members of the system. The frictional damping of recoil oscillations may be further increased, to any desired extent, by providing the hub portion of the head 25ᵖ with a "one way" friction grip device similar to that shown in Fig. 21.

The final illustrative embodiment of my present invention (Figs. 30 and 31) is quite similar in form to that just considered and will therefore be readily understood without extended description. The various parts of this embodiment are shown in their normal load position (static equilibrium) in Fig. 30. When the supplemental suspension system is subjected to a kinetic compression stress the resultant movement of the main spring and body toward the axle, and the accompanying outward movement of the L-shaped link frame 5�q on its axle perch support 3�q—under the thrust of the body connection 2�q—carries the parts toward the position shown in Fig. 31. This movement expands or opens up the supplemental spring shackles 4�q which couple the end of the main spring 1 to the lower head 25�q of the supplemental coil spring 4ᑫᑫ, but does not vary the initial tension of the latter element, because the head 25ᑫ is at this time supported on the link frame 5ᑫ, and is held against lateral displacement thereon by the radius guide rod 39ᑫ. But when the kinetic compressive strain is relieved, and the spring suspension elements have been returned to normal load position (Fig. 30)—by the closing of the expanded spring shackles 4ᑫ, and the relative upward movement of the body of the vehicle—the adjustable stop 6ᑫ on the frame 5ᑫ engages with an intermediate portion of the main leaf spring 1; and any rebound or separation of the spring connected chassis members then imposes a longitudinal tension on the arm 2ᑫ which lifts the radius guide arm 39ᑫ and the head 25ᑫ toward the dotted line positions r—r of Fig. 30. This movement compresses the initially tensioned coil spring 4ᑫᑫ against its upper head 27ᑫ (which is rigidly supported on the frame 5ᑫ), and also subjects the spring shackles 4ᑫ to an increased bending strain, which is transmitted to the eye end of the main spring 1 and which tends, in turn, to positively flex the outer portion of the latter element against the downward pressure of the link frame stop 6ᑫ. These concurrent flexures of the two secondary springs, 4ᑫ, 4ᑫᑫ, and of the main spring 1, cooperate to powerfully resist and very quickly check any abnormal expansion or rebound of the body and axle members; and the oppositely directed stresses in the symmetrically inclined arms 2ᑫ, 2ᑫ, on the opposite sides of the chassis frame, restrain or prevent any side sway or lateral displacement of the tonneau with respect to the running gear supports.

The general principles of functional action which characterize my improved shock absorber organization and the manner in which these characteristic features may be incorporated in a variety of structural forms—as illustrated, for example, by the different exemplifications hereinbefore presented—should now be clearly apparent, to those skilled in this art, without further explanation; and with the foregoing disclosure as a guide, engineers, and others familiar with the construction and use of vehicle suspension systems, can readily design other forms and arrangements of spring suspension elements (embodying in whole or in part my present invention), which will be particularly adapted to special types or species of vehicle chassis frames. In some cases it may be advantageous to utilize one of the means herein described—or some other equivalent instrumentalities—to frictionally or pneumatically retard or damp the spring action; in other cases better results will be obtained by eliminating all such means and allowing the spring elements to flex in their natural or free period of oscillation; and I have therefore presented certain exemplary embodiments of my improvements in which no special damping devices are employed—it being understood that the forced restraint, and the external retardation, of the normal compression or expansion of the resilient suspension members is not an essential or necessary part of this invention. It will also be understood that the supplemental link connections (e. g., 5**, 5ᑫᑫ etc.), and the means which I employ for limiting the arcuate or swinging movement of these connections, with respect to their support members, (e. g., the stops 6**, 6ᑫ etc.), may be widely varied in form and arrangement; and that the adjustments which are provided for bringing said limiting means into action at a predetermined point in the spring movement may in some cases be dispensed with, without altering the essential operative characteristics of my new combination of link frame-limit stop-spring-and lever connection elements, which conjoins the body and axle parts of the vehicle chassis and which acts to elastically restrain both vertical and lateral movements of their parts in the plane of the suspension system—whether that plane be transversely or longitudinally disposed with respect to the vehicle body. And it will be further understood that the particular forms of spring, (4\*\*\*\* 4^qq etc.) and the specific examples of lever arm connections (2\*\*\*\* 2^q etc.) which I have illustrated and described in connection with various embodiments of my invention, are to be regarded as merely typical or exemplary of many other analogous instrumentalities that may be employed as equivalent elements of my generic combination; and that I do not intend to limit myself to any specific details of organization, except as indicated in the appended claims; towit:

1. In a suspension system for two relatively movable members the combination of an arm flexibly connected to one of the said members, a link support pivotally mounted on the other member, a spring operatively connected at one end to the said arm and at the other end to the said link, and a stop for holding the link in fixed position with respect to its mounting when the said members are separated beyond normal load position.

2. In a suspension system for two relatively movable members the combination of an arm flexibly connected to one of the said members, a link support pivotally mounted on the other member, a spring operatively connected at one end to the said arm and at the other end to the said link, a stop for holding the link in fixed position with respect to its mounting when the suspension system is expanded, and means for adjusting the position of the said stop.

3. A spring suspension system for vehicles which comprises a main spring, an arm pivotally attached to one of the relatively movable chassis members, a link frame flexibly mounted on the other of the said members, a supplemental spring conjoining the said arm and the said frame and cooperating with the said main spring to resist displacements of the said members in either direction from the normal load position, and an adjustable stop for holding the link frame rigidly with respect to the member on which it is carried when the system is expanded beyond normal load position.

4. In a shock absorbing system for vehicles a combination of a swinging arm secured at one point to one of the relatively movable chassis members and operatively connected at another point to one end of a supplemental spring, a swinging link-frame flexibly attached to the other relatively movable chassis member and operatively connected to the opposite end of the said supplemental spring, and means whereby the said link frame is locked against movement with respect to its support when the chassis members rebound or separate beyond their normal load position.

5. A spring suspension system for the relatively movable members of a vehicle chassis which comprises a main spring, a rocking arm pivotally mounted on one of the said chassis members, a link-frame flexibly attached to the other of the said members, a supplemental spring operatively conjoined at its extremities to the said arm and the said frame, and an adjustable stop adapted to lock the said frame against lateral movement in the plane of spring suspension when the suspended chassis members are separated beyond their position of static equilibrium.

6. In a supplemental suspension for vehicle springs the combination of a secondary resilient member operatively connected at its opposite ends to the body and axle parts of the vehicle, means whereby the said secondary member is progressively flexed by the application of a transversely applied stress from the main spring when the body and axle parts of the vehicle approach each other, and other means whereby the said secondary spring is also progressively flexed by the application of a longitudinally applied stress from its end connections when the body and axle parts rebound beyond their normal load position.

7. In a supplemental suspension for vehicle springs the combination of a secondary spring member, an arm operatively connected at one point to one extremity of the said secondary spring and at another point to one of the vehicle members, a link frame operatively connected to the other extremity of the secondary spring and flexibly supported on another vehicle member, means conjoining the main vehicle spring with one of the parts thus operatively connected with the secondary spring whereby the latter is cooperatively flexed with the said main spring when the body and axle members approach each other, and a stop engaging with the link frame to prevent swinging movement on its support when the body and axle members rebound beyond the normal load position.

8. In a shock absorbing system for vehicles the combination of a main spring, an arm flexibly mounted on one of the vehicle members and shackled to the eye end of the main spring, a link frame flexibly supported on another vehicle member which is relatively movable with respect to the first, a stop for limiting the outward movement of the said link frame with respect to its support, and a supplemental spring operatively conjoined at its opposite extremities to the said arm and the said link.

9. A spring suspension system for a vehicle chassis which comprises a main leaf spring secured at the center to one of the relatively movable chassis members, a lever pivotally mounted on the other of said relatively movable members and flexibly connected to the eye end of said main spring, a link frame flexibly supported on the first mentioned chassis member, means for limiting the arcuate movement of the said frame with respect to the said supporting member, and a supplemental spring operatively connected at its ends to the said lever and the said frame.

10. In a spring suspension system for two relatively movable members the combination of a main spring rigidly secured to one of said members, a lever pivotally mounted at one point in its length on the other of the said members, and flexibly attached at another point to the eye end of the said main spring, a supplemental spring operatively connected to still another point on the said lever, a link-frame pivotally supported on the first mentioned member of the chassis and operatively connected to another part of said supplemental spring, means for arresting the swinging movement of the flexibly supported link-frame when the aforesaid relatively movable members are separated beyond a certain point, and means for adjusting the point at which the said swinging movement is arrested.

11. In a shock absorbing system for vehicles the combination of a swinging arm pivotally mounted on one of the relatively movable members of the vehicle chassis, a second swinging arm flexibly supported on the other of the said members, means for preventing the swinging movement of the said second arm with respect to its supporting member when the chassis parts rebound beyond normal load position, and an initially bowed leaf spring operatively connected at its opposite extremities to the aforesaid arms.

12. In a vehicle suspension system the combination of a relatively stiff main leaf spring, a relatively flexible supplemental leaf spring operatively connected at its opposite ends to the body and axle members of the vehicle, means whereby the said supplemental spring is progressively flexed by transversely applied stress when the said body and axle members approach each other, and other means whereby this spring is correspondingly flexed by longitudinally applied stress when the said body and axle members rebound or are separated beyond normal load position.

13. A shock absorber system for vehicles which comprises, the combination of a main spring interposed between the body and axle members, an arm pivoted to one of said members, a supplemental spring operatively connected at one end to the said arm, means for flexibly supporting the other end of said spring on the other of said members, and means for holding the last mentioned end of said supplemental spring in fixed relationship to its associated supporting member when the system rebounds or expands beyond normal load position.

14. A spring suspension system for vehicles which comprises, a main spring interposed between the relatively movable chassis members, an arm pivotally mounted on one of said members, a supplemental spring operatively connected at one end to the said arm, a link frame flexibly supported on the other of the said chassis members and coupled to the other end of the said spring, and means for frictionally retarding the flexing movement of the said link frame on its chassis support.

15. A spring suspension system for the relatively movable chassis members of a vehicle which comprises, an arm pivotally supported on one of said members, a link frame flexibly mounted on another of said members, a supplemental spring operatively connected at one end to the said arm and at the other end to the said link, and means for frictionally restraining the movements of the said link in one direction.

16. A shock absorber for two relatively movable parts which comprises two members flexibly mounted one on each of the said parts, a spring interposed between the members and operatively connected thereto at its opposite ends, and means for frictionally retarding the flexing movement of one of said members when the parts are separated from one another.

17. In a spring suspension system for vehicles the combination of a member flexibly supported on the axle assembly, a second member flexibly mounted on the body assembly, a supplemental spring operatively connected at its opposite ends to the aforesaid members and acting to elastically resist the compression of the system, and a one way friction device acting on one of said members to retard the expansion thereof.

18. A shock absorber for vehicles which comprises the combination of two members flexibly mounted one on the axle assembly and the other on the body portion of the vehicle, a supplemental spring operatively secured at its opposite ends to the said members and acting to elastically resist the approach of the axle and body parts, means for frictionally damping the flexing movement of one of said members when the said parts separate from each other, and other means for holding one of said members against flexing movement with respect to its mounting when the body and axle rebound beyond normal load position.

In testimony whereof I have hereunto set my hand.

FRANK L. O. WADSWORTH.